United States Patent [19]

Roos

[11] Patent Number: 4,684,298

[45] Date of Patent: Aug. 4, 1987

[54] DRILL

[75] Inventor: Aage V. Roos, Skärplinge, Sweden

[73] Assignee: Santrade Limited, Lucerne, Switzerland

[21] Appl. No.: 864,146

[22] Filed: May 16, 1986

[30] Foreign Application Priority Data

May 17, 1985 [SE] Sweden .............................. 8502450

[51] Int. Cl.⁴ ............................................ B23B 51/02
[52] U.S. Cl. ..................................... 408/59; 408/199; 408/231; 408/239 R; 408/713
[58] Field of Search ..................... 408/56, 57, 59, 199, 408/200, 227, 231, 713, 239 R, 196

[56] References Cited

U.S. PATENT DOCUMENTS

| | | | |
|---|---|---|---|
| 1,746,716 | 2/1930 | Sasse | 408/59 |
| 2,237,901 | 4/1941 | Chun | 408/227 |
| 2,640,378 | 6/1953 | Haggar | 408/57 |
| 3,085,453 | 4/1963 | Mossberg | 408/59 |
| 4,222,690 | 9/1980 | Hosoi | 408/230 |
| 4,565,473 | 1/1986 | Hosoi | 408/229 |

FOREIGN PATENT DOCUMENTS 13745 4/1965 Japan ...................................... 408/59

Primary Examiner—Gil Weidenfeld
Assistant Examiner—Daniel W. Howell
Attorney, Agent, or Firm—Burns, Doane, Swecker & Mathis

[57] ABSTRACT

The invention relates to a drill for metal drilling, comprising a drill body and a drill tip provided with cutting portions. The drill tip is detachably secured to the drill body by means of fastening devices, which are arranged on opposite sides of the centerline (CL) of the drill. The planar lower face of the drill tip is provided with a central tap which engages in a central recess in the mainly planar front surface of the drill body in order to center the drill tip relative to the drill body. A central fluid passage is formed in the drill body, which transforms into eccentrically arranged fluid passages in the drill tip. The fastening devices form at least partly walls in the eccentrical fluid passages.

7 Claims, 7 Drawing Figures

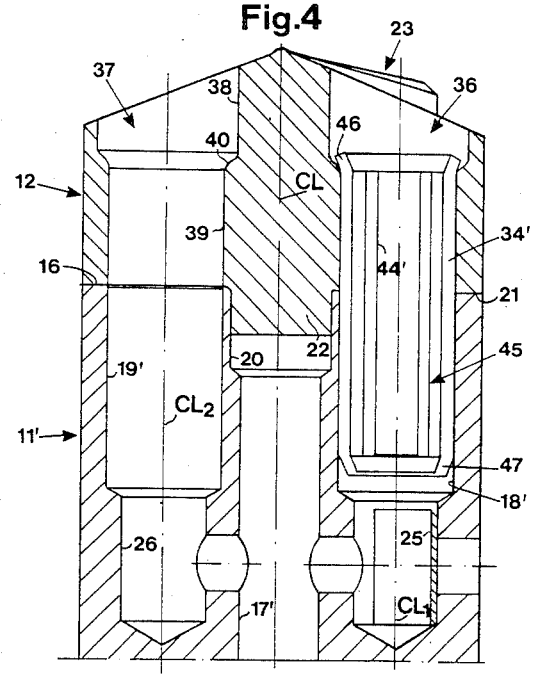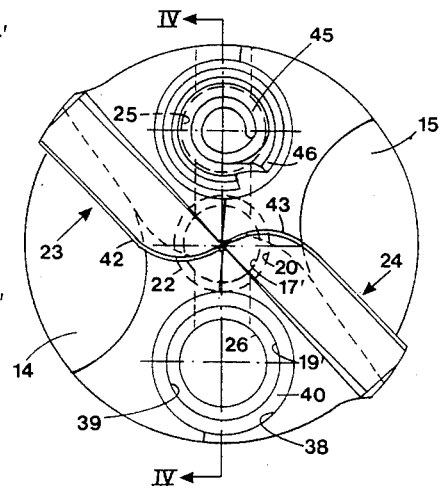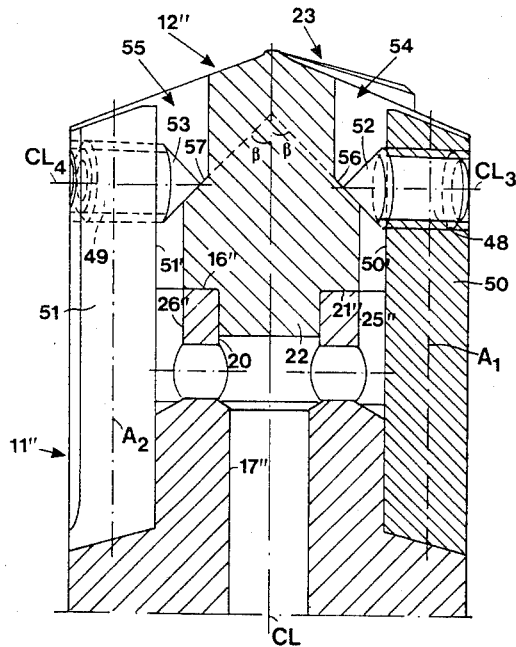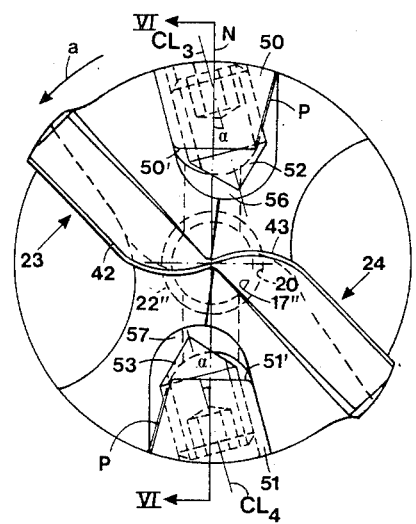

DRILL

BACKGROUND OF THE INVENTION

The present invention relates to a drill comprising a drill body provided with straight or screw-shaped chip flutes, coolant passages, and a drill tip provided with cutting elements.

Conventional drills of the above-mentioned type having inserts brazed to the drill body have the disadvantage that the worn inserts have to be released and the drill has to be exposed to a time-consuming rebrazing with new inserts inserted into the drill body or even to regrinding of the worn inserts secured in the drill body. It is not economical to dispose of the drill body when the edge portion becomes worn since the drill body has a longer life than the inserts. Furthermore, the grinding of the brazed inserts requires certain handling of the somewhat bulky drill body. Drill tips having brazed inserts connot be coated by the method providing the most wear-resistant result since this method demands a higher temperature than the fusing point of the brazing metal. Furthermore, it is important that the drill tip abuts on a planar front surface on the drill body such that the drill tip does not risk tilting. The object of the present invention is to provide a drill which overcomes the above-mentioned problems.

THE DRAWINGS

The invention will be more clearly described hereinafter in connection with the appended drawings, wherein further characterizing features and advantages will become apparent.

FIGS. 4 and 5 show another embodiment of a cutting portion of a drill according to the invention in cross-sectional view and in a top view, respectively.

FIGS. 6 and 7 show an additional embodiment of a cutting portion of a drill according to the invention in a cross-sectional side view and in a top view, respectively.

DETAILED DESCRIPTION OF A PREFERRED EMBODIMENT OF THE INVENTION

Figure 1:
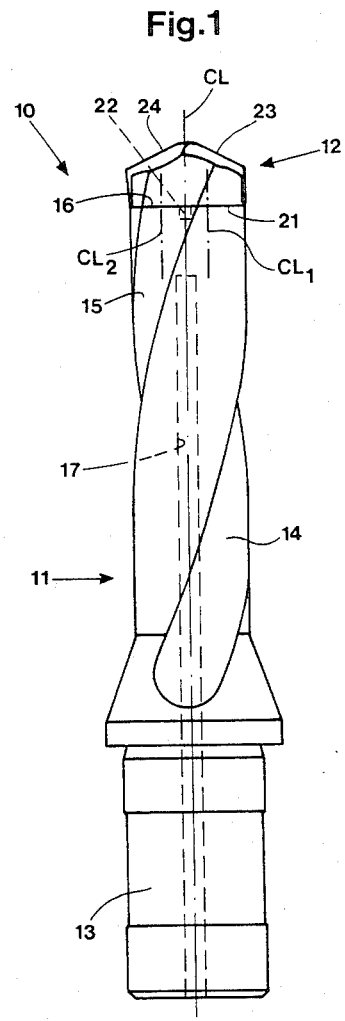
FIG. 1 shows a drill according to the invention in a side view.

FIG. 1 shows a drill 10 according to the invention comprising a drill body 11 and a drill tip 12. The drill body 11 has a mainly cylindrical basic shape and comprises a shank 13 at its real fastening end and two screw-shaped chip flutes 14, 15 which extend from the shank 13 to the of the drill body. The front surface 16 of the drill body is planarly shaped and is perpendicular to the centerline CL of the drill. A central fluid passage 17 has an extension forwards from the fastening end to a distance axially short of the front surface 16. There the passage 17 meets two diametrically opposite passages, whose centerlines $CL_1$, $CL_2$ are shown in FIG. 1. A central recess 20 is formed in the front surface 16 to receive a central tap 22 provided at the lower face 21 of the drill tip 12. Their peripheries are preferably round, but they may also be oval or polygonal. Alternatively the recess may be formed in the drill tip, and the tap projecting from the front surface of the drill body. The chip flutes may alternatively be straightly shaped. The drill body is intended to be machined and hardened separately from the drill tip.

The drill tip 12 has a round basic shape corresponding to the diameter of the drill body and it has an axial length of maximum a fifth of the length of the drill body. The drill tip is preferably completely made of hard material, and therefore it may be surface coated at a high temperature without any risk of the solder or braze joint fusing. The tip may also consist of high speed steel if softer work pieces are to be machined. The drill tip 12 comprises chip flutes, which are provided to be direct extensions of the chip flutes 14, 15 of the drill body, also comprises portions 23, 24.

Figure 2:
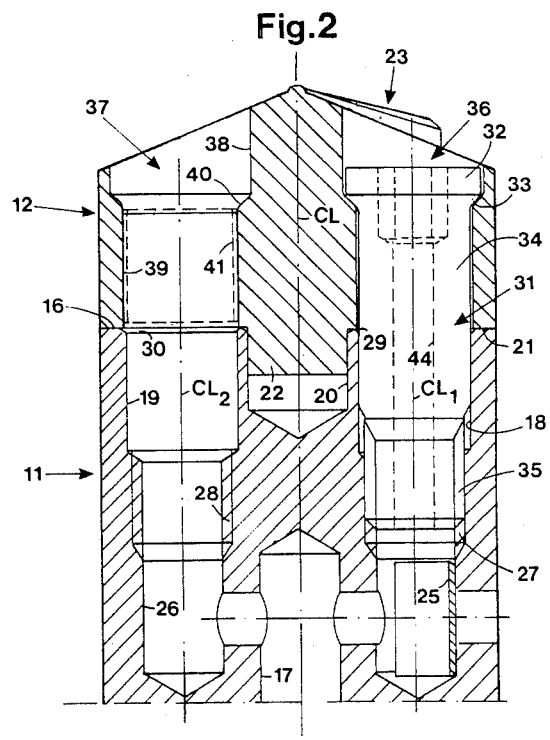
FIGS. 2 and 3 show an embodiment of a cutting portion according to the invention in a cross-sectional view and in a top view, respectively.
Figure 3:
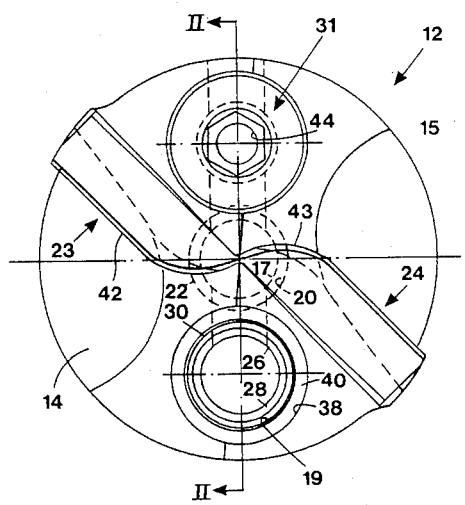

FIGS. 2 and 3 show an embodiment of the axially front part of the drill shown in FIG. 1, in magnification. FIG. 2 shows a cross-section according to the line II—II in FIG. 3. The central fluid passage is connected to two shorter fluid passages 25, 26 arranged on opposite sides of and parallel to the centerline CL. Each short fluid passage 25, 26 has a threaded portion 27, 28, which transforms into a larger diameter portion 18, 19. Said portion 18, 19 terminates in the front surface 16 via a bevel 29, 30 provided to facilitate the entering of a lock screw 31 in said portion. Only one lock screw is shown in FIGS. 2 and 3 for the sake of perspicuity. The connections between the central passage 17 and the shorter passages 25, 26 have been achieved by drilling radially inwards from the right in FIG. 2. A collet has been fitted into the passage 25 to shut off the hole towards the envelope surface of the drill body. The lock screw 31 consists of a cylindrical head 32, which transforms into a cylindrical shank 34 via a conical portion 33 and a threaded portion 35. The lock screw 31 is provided with a central, through hole 44, which is to conduct fluid axially forwards. The fluid is fed in order to flush away chips along the chip flutes, to lubricate and to cool. The drill tip 12 has two cylindrical holes 36, 37 consisting of an axially front portion 38 and a narrower axially rear portion 39, which are met in a convex portion 40.

When mounting the tip 12 to the body 11 the lower face 21 of the tip is brought against the front surface 16 such that the tap 22 enters into the recess 20. The lock screws 31 are thereafter inserted into the holes 36, 37 of the drill tip and are screwed inwardly into the threaded portions 27, 28 of the fluid passages 25, 26. During the inwards screwing the shank 34 of the screw is supported by respective portion 18, 19 in the drill body 11. The conical portion 33 of the screw 31 will thereby abut against respective convex portion 40 of the holes 36, 37 and thus the lower face 21 of the drill tip is firmly pulled against the front surface 16 of the drill body. The screws 31 are arranged to transmit a turning moment from the drill tip to the drill body, and therefore the screws should be relatively rigid. A thin collet 41, shown with dotted lines in FIG. 2, may be fitted into the portion 39 to prevent tolerance faults from negatively influencing the clamping. The collet is cylindrical. The collet consists of a material, copper or aluminium for example, which is softer than the material, steel for example, which the screw is made of. During the drilling with the tool, the collet compensates for possible tolerance faults arising during the manufacturing of the drill, such that both of the screws transmit the turning moment. The cutting portions 23, 24 have main cutting edges 42, 43 which meet in the center of the tip 12, forming an S-shaped contour and positive chip faces. The radius of curvature of the main cutting edges 42, 43 is smaller in the vicinity of the centerline of the drill than further away from it. The forms of the main cutting edges and the chip faces are more closely described in Swedish Application Nos. 7812393-2, filed and 8105094-0, filed which are hereby incorporated in the description.

FIGS. 4 and 5 show an alternative embodiment of the axially front end of the drill, in magnification. FIG. 4 shows a cross-section according to the line IV—IV in FIG. 5. Parts identical with parts of the drill according to FIGS. 1-3 have been given the same numbers. In this embodiment the tip is clamped to the drill body 11' by two radially resilient tube pins 45. Each pin 45 consists of a piece of rolled sheet of high strength spring steel and has a length the unrolled state which is about 3 times the circumference of the rolled pin. The pin 45 has a conical collar 46, a cylindrical shank 34' and a conical portion 47, to facilitate the mounting. The radially inner portion of the pin is shorter in axial direction than the outer portion such that its ends become simpler to machine. The pin is centrally hollow and forms a fluid passage 44'. The central fluid passage 17' terminates in the recess 20. Cylindrical holes 18', 19' coaxially connect to the shorter fluid passages 25, 26 on opposite sides of the centerline CL of the drill.

When mounting the tip 12 to the body 11' the lower face 21 of the tip 12 is brought against the front surface 16 such that the tap enters into the recess 20. The pins 45 are thereafter inserted into the holes 36, 37 of the drill tip and are knocked into the cylindrical holes 18', 19' of the drill body. The pins 45, which are arranged with slightly larger diameter than the holes 39 and 18', 19' of the tip and the body, will during the inwards knocking assume the diameter of said holes, since the pins are made to be resilient; not more resilient, though, than to give rise to a relatively large friction between the pin and the holes. The conical collar 46 of the pin finally abuts against the convex portion 40 of the hole 36, 37, and therefore the lower face 21 of the drill tip is firmly pulled against the front surface 16 of the drill body.

For dismounting the tip from the body a tool is inserted axially from behind into the central fluid passage 17' and is thrust against the end surface of the tap until the pins are drawn out of engagement with the holes 18', 19' of the body.

FIGS. 6 and 7 show another alternative embodiment of the axially front part of the drill, in magnification. FIG. 6 shows a cross-section according to the line VI—VI in FIG. 7. Parts identical with parts of the drill according to FIGS. 1-5 have been given the same numbers. In this embodiment the tip 12" is held by two screws 48, 49 which are in threaded engagement with bars 50, 51, secured in the drill body 11" and in engagement with the tip. The bars 50, 51 extend in the axial direction of the drill body, and they are arranged diametrically opposite to each other. The bars have a mainly rectangular basic shape, and one long side coincides with the envelope surface of the body. The bars are fixed in grooves in the body, mechanically or by brazing. The axially front parts of the bars are each provided with a threaded bore whose respective center axis $CL_3$, $CL_4$ forms an acute angle $\alpha$ with a normal N to the centerline CL of the drill and forms a right angle with the longitudinal axis $A_1$, $A_2$ of the respective bar. Each screw 48, 49 is provided with a conical end 52, 53 which is facing radially into the drill. The other end of the screw is provided with a key grip.

The drill tip 12" is provided with grooves 54, 55 which extend primarily in the axial direction. The radially inner portion 56, 57 of each groove is mainly conically shaped, and therefore that portion forms an acute angle $\beta$ with the centerline CL, in a cross-section along the normal N, and inclines outwardly and backwardly. The groove and the associated bar 54, 50; 55, 51 are shaped such that a play p is formed between the rear surface, in the rotational direction of the drill, of the groove and the bar. Said direction is indicated by the arrow a in FIG. 7.

The fluid passage 17" terminates in the recess 20, which is intended to be shut by the tap 22 of the tip. The bars 50, 51 form walls 50', 51' in the short fluid passages 25", 26".

At mounting of the tip 12" to the body 11", when the screws 48, 49 are partly unscrewed, the lower face 21" of the tip is brought against the front surface 16", so that the tap 22 enters into the recess 20 and so that the grooves 54, 55 receive the bars 50, 51. Thereafter the screws 48, 49 are screwed inwardly so that they abut against respective conical portion 56, 57. During further inwards screwing the screws force the tip 12" to a small rotation until the front surface, in the rotational direction, of the grooves abut against associated surfaces on the bars, as well as forcing the lower face of the tip to press against the front surface. The flush medium now has a possibility to be conducted via the passages 17", 25" and 26" past the conical ends 52, 53 of the screws and towards the cutting area. At dismounting of the tip from the body the screws 48, 49 are at least partly unscrewed, whereafter the tip can be removed axially outwardly.

Thus the present invention relates to a drill which makes possible a good utilization of the drill body, as well as surface coating at high temperatures and a precise and safe positioning of the tip of the drill.

I claim:

1. A rotary drill comprising a drill body, a drill tip, and fasteners securing said drill tip to a front end of said drill body; said drill body comprising front-to-rear extending first chip flutes, a generally planar front surface, a forwardly open recess disposed in said front surface along a longitudinal centerline of said drill body, first holes for receiving said fasteners, and fluid passages for conducting drilling fluid to said drill tip; said drill tip including a generally planar rear surface resting against said front surface, a tap projecting rearwardly from said rear surface and disposed in said recess, second chip flutes aligned with and forming forward extensions of said first chip flutes, cutting edges disposed at front ends of said second chip flutes, a plurality of longitudinally extending second holes aligned with said first holes, said first and second holes together defining fastener-receiving hole means for receiving said fasteners which extend between said drill body and said drill tip for urging said drill tip against said drill body and transmitting rotary forces from said drill body to said drill tip; and thin cylindrical collets positioned in said hole means between said fasteners and walls of said hole means, said collets formed of a softer material than said fasteners so as to be deformable to compensate for dimensional imprecisions between said fasteners and said walls of said hole means.

2. A drill according to claim 1, wherein said drill tip includes fluid passages aligned with said fluid passages of said drill body.

3. A drill according to claim 2, wherein said passages in said drill tip and drill body extend through said fasteners.

4. A drill according to claim 3, wherein said fasteners comprise hollow screws.

5. A drill according to claim 3, wherein said fasteners comprise hollow, radially resilient pins.

6. A drill according to claim 1, wherein said recess and tap are of cylindrical cross-section.

7. A drill according to claim 1, wherein said collets are disposed in said second holes.

* * * * *